United States Patent
Kang et al.

(10) Patent No.: US 6,346,947 B1
(45) Date of Patent: Feb. 12, 2002

(54) MPEG-DECODER AND MPEG DECODING METHOD WITH TWO MEMORY CONTROLLERS

(75) Inventors: Hoai Sig Kang; Dong Bum Koh, both of Kyoungki-do (KR)

(73) Assignee: Hyundai Electronics Industries Co., Ltd., Ichon-shi (KR)

(*) Notice: Subject to any disclaimer, the term of this patent is extended or adjusted under 35 U.S.C. 154(b) by 0 days.

(21) Appl. No.: 09/222,792

(22) Filed: Dec. 30, 1998

(30) Foreign Application Priority Data

Dec. 30, 1997 (KR) .............................. 97-77861

(51) Int. Cl.[7] ................................. G09G 5/39
(52) U.S. Cl. ...................... 345/532; 345/555; 345/536
(58) Field of Search ................................. 345/532, 531, 345/520, 555, 536, 533; 348/699, 714–718

(56) References Cited

U.S. PATENT DOCUMENTS

| | | | |
|---|---|---|---|
| 5,513,301 A | * 4/1996 | Wakasu | 395/114 |
| 5,703,579 A | 12/1997 | Nonaka et al. | 341/50 |
| 5,801,776 A | * 9/1998 | Tamura et al. | 348/403 |
| 5,903,282 A | * 5/1999 | Schoner et al. | 345/507 |
| 6,167,475 A | * 12/2000 | Carr | 710/113 |

FOREIGN PATENT DOCUMENTS

GB    2312127 A    10/1997    ............ H04N/7/50

* cited by examiner

Primary Examiner—Kee M. Tung
(74) Attorney, Agent, or Firm—Jacobson Holman, PLLC (57) ABSTRACT

An MPEG decoder and an MPEG decoding method with two memory controllers is capable of separately controlling compressed data and decoded data. An MPEG decoder decodes a compressed input data formatted in an MPEG type. The MPEG decoder comprises a compressed data memory controller and a decoded data memory controller. The compressed data memory controller is coupled to a compressed data memory and controls the compressed data. The decoded data memory controller is coupled to a decoded data memory, and controls the decoded data. Since the compressed data flow and the decoded data flow are divided, the memory transfer rate is increased, and also the memory control is simple. In addition, the compressed data are able to be stored within the MPEG decoder. Therefore, the high-performance of the MPEG decoder and the high quality of the image are possible.

4 Claims, 6 Drawing Sheets

MPEG-DECODER AND MPEG DECODING METHOD WITH TWO MEMORY CONTROLLERS

BACKGROUND OF THE INVENTION

1. Technical Field

This invention relates to an MPEG decoder and an MPEG decoding method, more particularly, to an MPEG decoder and an MPEG decoding method with two memory controllers capable of separately controlling compressed data and decoded data.

2. Description of the Related Arts

Figure 1:
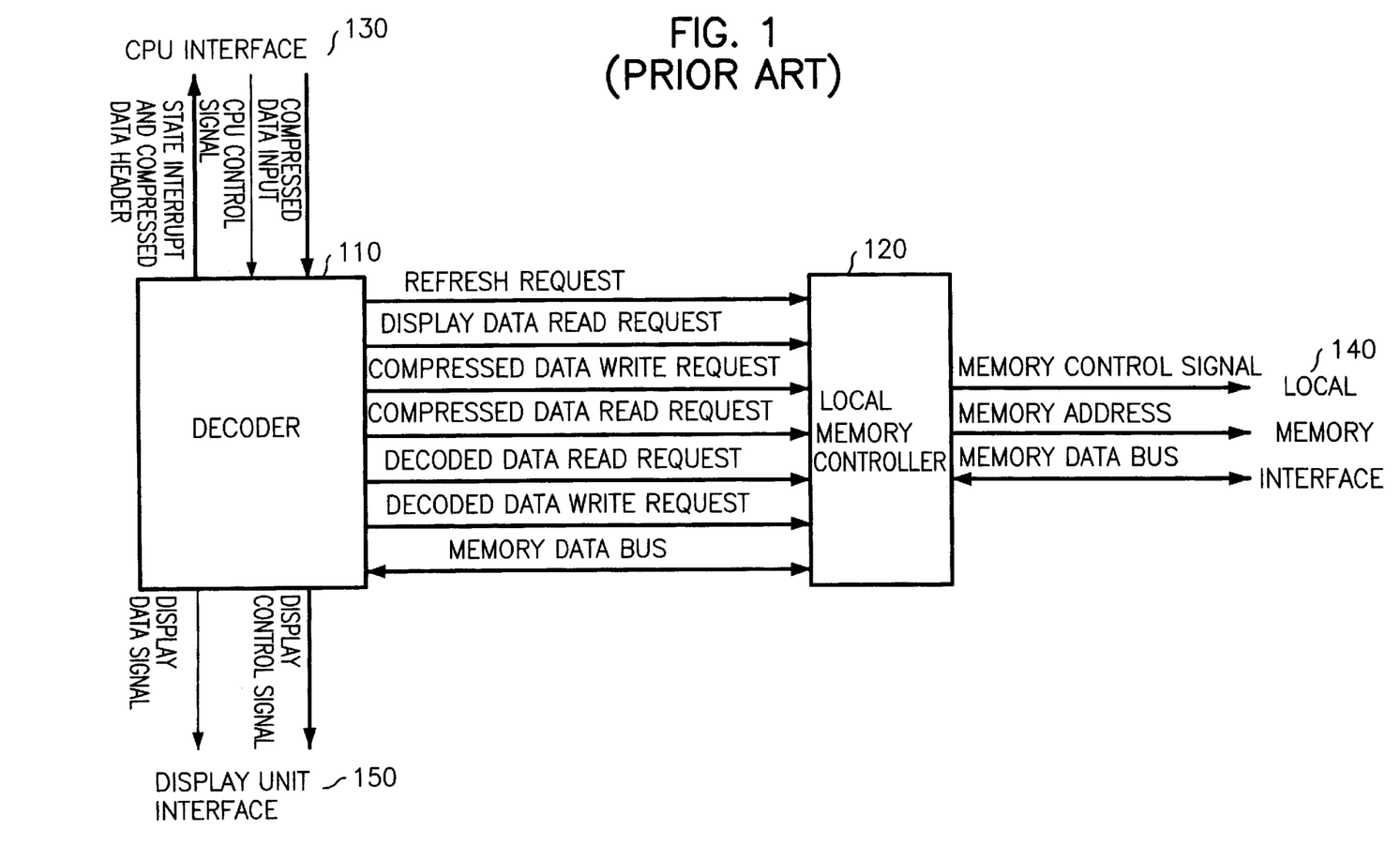
FIG. 1 is a block diagram of a prior MPEG decoder having one memory controller.

FIG. 1 shows a prior art of an MPEG decoder having one memory controller. As shown in FIG. 1, the MPEG decoder includes a CPU (central process unit) interface 130 which interfaces a CPU and a decoder 110; the decoder 110 for decoding compressed data; a local memory controller 120; a local memory interface 140 for interfacing the local memory controller 120 with an outer memory; and a display interface 150 for interfacing the decoder 110 and a display unit.

The operation of the MPEG decoder shown in FIG. 1 is as follows.

According to a control signal of the CPU, the decoder 110 receiving the compressed data from the CPU through the CPU interface 130, outputs a compressed data write request signal and the compressed data to the local memory controller 140. On the other hand, when the compressed data write request signal is inputted, the local memory controller 120 outputs a memory control signal, a memory address and memory data to the local memory interface 140 in order to store the compressed data in a local memory.

The decoder 110, which receives the decoding control signal from the CPU, sends a compressed data read request signal to the local memory controller 120 to read the compressed data stored in the local memory. On the other hand, when the compressed data read request signal is inputted to the local memory controller 120, the local memory controller 120 sends the memory control signal, the memory address and the memory data to the local memory interface 140. And then the local memory controller 120 reads the compressed data from the local memory and sends it to the decoder 110.

The decoder 110 receiving the compressed data from the local memory controller 120, outputs a decoded data read request signal to the local memory controller 120 to read the decoded data from the local memory. On the other hand, when the decoded data read request signal is inputted to the local memory controller 120, the local memory controller 120 sends the memory control signal, the memory address and the memory data to the local memory interface 140 in order to read the decoded data from the local memory interface and send it to the decoder 110.

On the other hand, the decoder 110 receiving the decoded data from the local memory controller 120, decodes the compressed data and then sends a decoded data write request signal and the decoded data to the local memory controller 120 to store it in the local memory. On the other hand, the decoded data write request signal is inputted, the local memory controller 120 sends the memory control signal, the memory address and the memory data to the local memory interface 140 to store the decoded data in the local memory.

The decoder 110 receiving a display control signal from the CPU, inputs a display data read request signal to the local memory controller to read the decoded data from the local memory and to send it to the display unit through the display interface 150. On the other hand, the display data write request signal is inputted from the decoder 110, the local memory controller 120 sends the memory control signal, the memory address and the memory data to the local memory interface 140 to read the decoded data from the local memory. The read data is sent to the decoder 110.

At this time, in case that the local memory is implemented by a dynamic RAM(DRAM), the decoder 110 must have a refresh function so that the decoder 110 generates a refresh request signal to the local memory controller 120 in order to perform the refresh operation. Since above described functions have a priority, the local memory is utilized by the priority.

Figure 2:
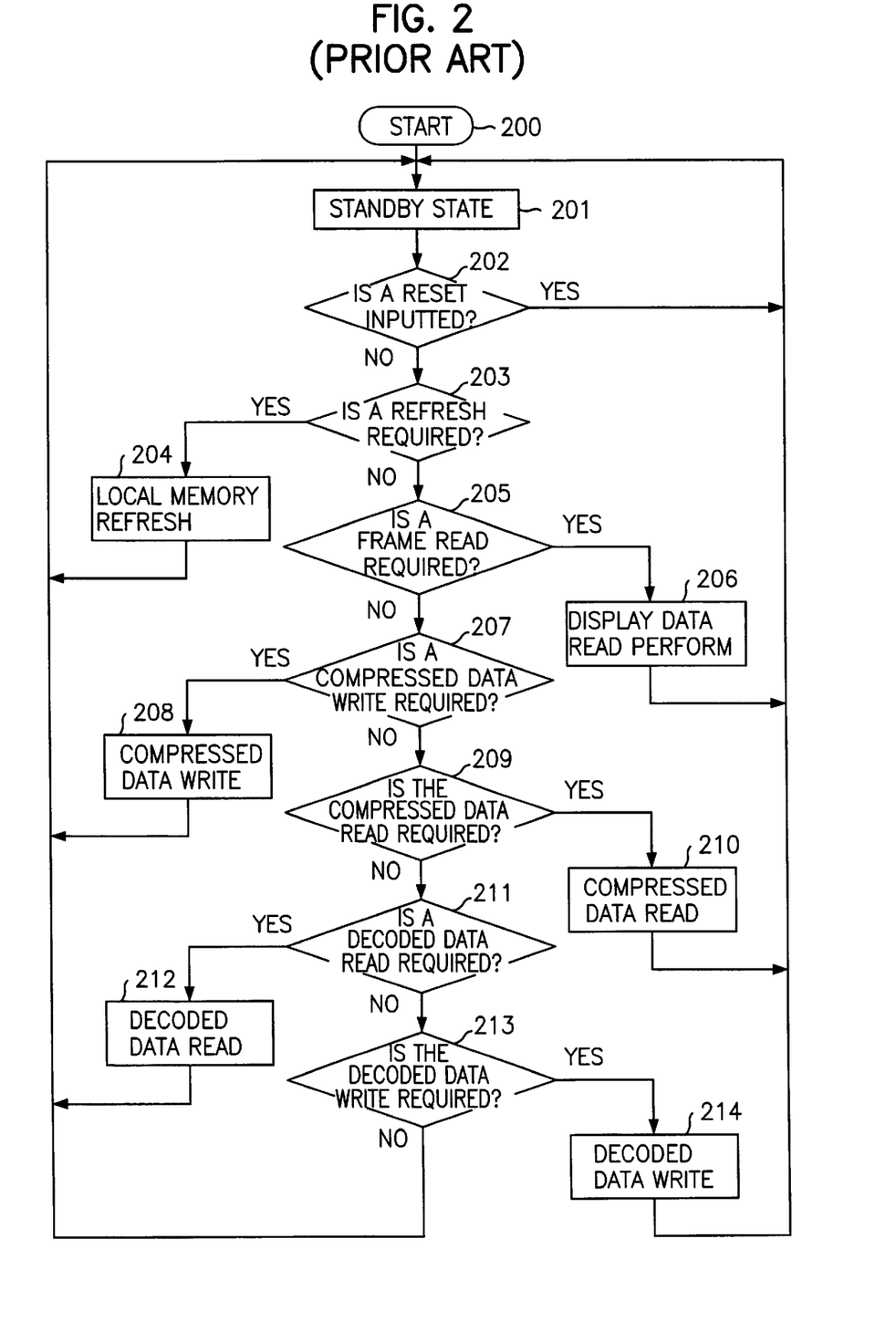
FIG. 2 shows a flowchart of an MPEG decoding method of the MPEG decoder of FIG. 1.

FIG. 2 shows the flowchart of the MPEG decoder of the FIG. 1. As shown in FIG. 2, the MPEG decoding method utilizing the MPEG decoder with one memory controller is as follows.

In a standby state, when an outer signal is inputted, it is determined whether a reset signal is inputted or not (S202).

When the reset signal is inputted, the standby state is returned. Otherwise, it is determined whether a refresh operation is required or not (S203). In case that the refresh operation is required, the local memory is refreshed (204), and then the standby state is returned. In case that the refresh operation is not required, it is determined whether a frame read is required or not.

In case that the frame read is required, a display data read operation is performed (206), and then the standby state is returned. In case that the frame read is not required, it is determined whether a compressed data write is required (207). In case that the compressed data write is required, the compressed data write operation is performed (208), and then the standby state is returned. On the other hand, the compressed data write is not required, it is determined whether a compressed data read is necessary or not (209).

In case that the compressed data read is necessary, the compressed data read operation is performed (210), and then the standby state is returned. In case that the compressed data read is not necessary, it is determined a decoded data read is determined (211). In case that the decoded data read is required, the decoded data read operation is performed (212), and then the standby state is returned. In case that the decoded data read is not required, it is determined whether a decoded data write operation is required or not (213).

On the other hand, the decoded data write operation is required, the decoded data write operation is performed (214), and then the standby state is returned, and than the standby state is returned. In case that the decoded data write operation is not required, the standby state is returned. Since a common local memory is alternatively used according to the priority, in some applications, for example, an HDTV (High Definition Television), the local memory request is increased so that a memory control is complicated and there occurs a bottle neck phenomenon in a local memory access operation.

SUMMARY OF THE INVENTION

Therefore, the present invention is to provide an MPEG decoder and an MPEG decoding apparatus with two memory controllers capable of increasing the memory data sending ability and capable of having the architecture of the memory controller simple and easy by separately storing the compressed data and the decoded data.

According to the present invention, a decoder decoding a compressed input data formatted in an MPEG type, comprises a compressed data memory controller and a decoded memory controller. The compressed data memory controller is coupled to a compressed data memory and controls a compressed data. The decoded data memory controller is coupled to a decoded data memory and controls a decoded data.

A method of controlling a compressed data memory in accordance with present invention, comprises steps of: determining whether a reset signal is inputted or not when an outer signal is inputted in a standby state, to return to the standby state if the reset signal is inputted or to determine whether a refresh is required or not if the reset signal is not inputted; returning to the standby state after operating of the compressed data memory in case that refresh is necessary, and determining whether the compressed data write is necessary or not in case that the refresh is not required; returning to the standby state after performing the compressed data write operation, in case that the compressed data write operation is required, and determining whether the compressed data read operation is required or not, in case that said compressed data write operation is not required; and returning to the standby state after performing compressed data read in case that the compressed data read operation is required, and returning to the standby state in case that the compressed data read operation is not required.

A method of controlling a decoded data memory in accordance with present invention, comprises the steps of: determining whether a reset signal is inputted or not when an outer signal is inputted in a standby state, to return to the standby state if the reset signal is inputted or to determine whether a refresh is required or not if the reset signal is not inputted; returning to the standby state after operating of the compressed data memory in case that refresh is necessary, and determining whether a frame read is required or not in case that the refresh is not required; returning to the standby state after performing a display data read, in case that the frame read is required, and determining whether the decoded data read operation is required or not, in case that said frame read is not required; returning to the standby state after performing decoded data read in case that the decoded data read operation is required, and determining whether the decoded data write operation is required or not in case that the decoded data read operation is not required; and returning to the standby state after performing decoded data write in case that the decode data write operation is required, and returning to the standby state in case that the decoded data write operation is not required.

These and other features of the present invention are more fully shown and described in the drawings and detailed description of this invention. It is to be understood, however, that the description and drawings are for the purpose of illustration and should not be read in a manner that would unduly limit the scope of this invention.

BRIEF DESCRIPTION OF THE DRAWINGS

For a more complete understanding of the present invention and the advantage thereof, reference is now made to the following description taken in conjunction with the accompanying drawings in which.

DETAILED DESCRIPTION OF THE INVENTION

Figure 3:
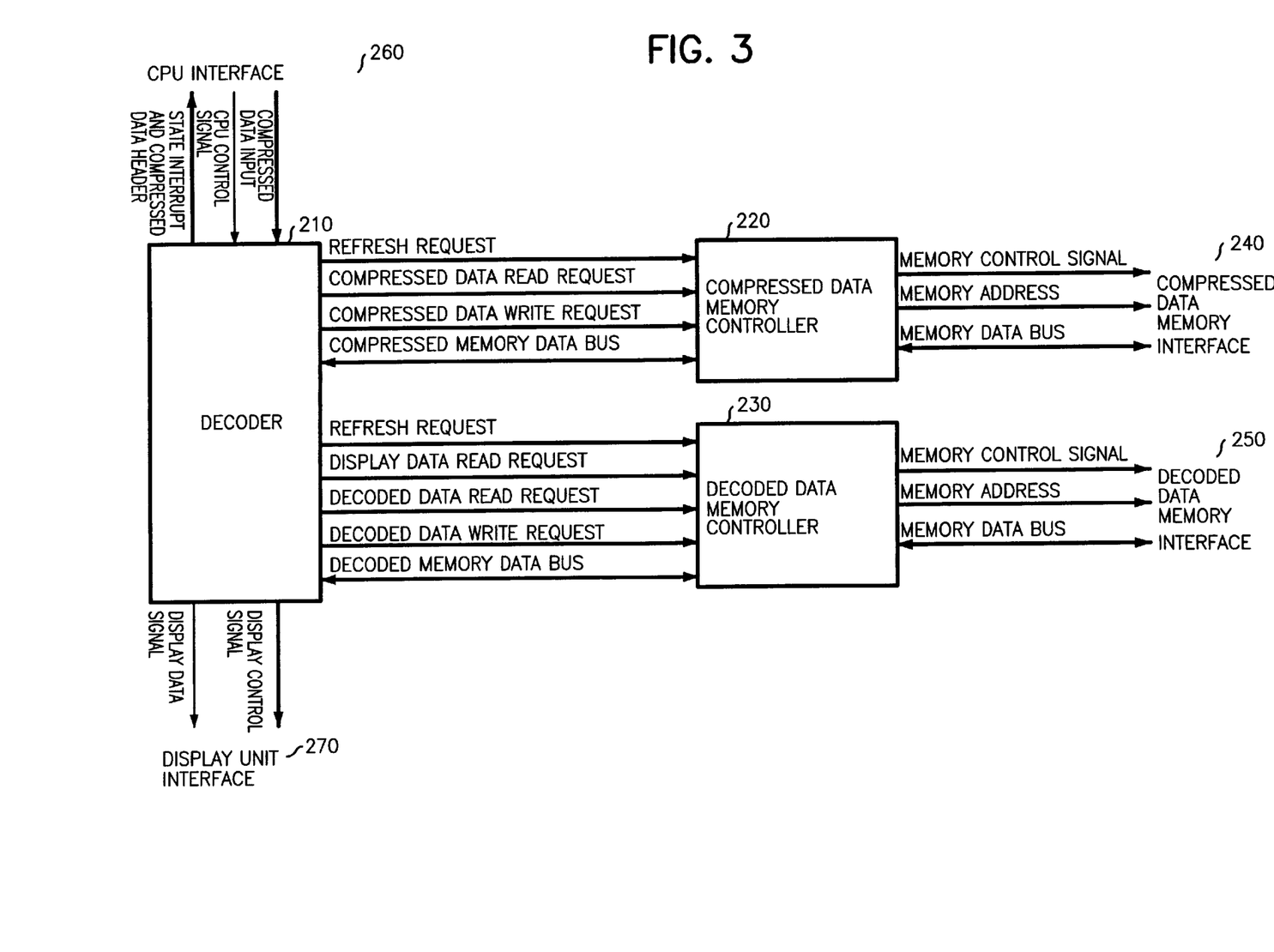
FIG. 3 describes a block diagram of an MPEG decoder with two memory controllers in accordance with the present invention.

FIG. 3 describes a block diagram of an MPEG decoder with two memory controllers in accordance with the present invention.

As shown in FIG. 3, the MPEG decoder includes a CPU interface 260 receiving and transferring a control signal and compressed data; a decoder 210 performing an MPEG decoding function according to the control signal from a CPU; a compressed memory controller 220 receiving a compressed data write request signal to write a compressed data within a local memory and receiving a compressed data read request signal to read the compressed data from local memory; a compressed data memory interface 240 for interfacing the compressed data memory controller 220 with a compressed data memory; a decoded memory controller 230 receiving the decoded data read/write request signal to read/write the decoded data from/to the decoded data memory; a decoded data memory interface 250 for interfacing the decoded data memory controller 230 with the decoded data memory; and a display unit interface 270 for interfacing a display unit with the decoder 210.

The operation of the MPEG decoder having two memory controllers of FIG. 3 is as follows.

The decoder 210 performs a CPU interface function, a compressed data decoding function and a display unit interface function. Wherein, implementing of the CUP interface function and the display interface function is identical to the prior art, and in case of implementing of the compressed data decoding function, the local memory is divided to the compressed data memory and the decoded data memory.

The decoder 210 receiving and storing the control signal and the information signal utilized in the data decoding.

The decoder 210 having received-the compressed data from the CPU interface 260 provides the compressed data and the compressed data write request signal to the compressed data memory controller 220. On the other hand, when the compressed data write request signal is inputted to the compressed data memory controller 220, the compressed data memory controller 220 sends a memory control signal, a memory address and memory data to the memory interface in order to store the compressed data at the compressed data memory.

In order to read the compressed data from the compressed data memory, the decoder 210 outputs the compressed data read request signal to the compressed data memory controller 220. On the other hand, when the compressed data memory controller 220 receives the compressed data read request signal from the decoder 210, the compressed data memory controller 220 sends the memory control signal, the memory address and the memory data to the compressed data memory interface 240 to read the compressed data from the compressed data memory and to provide it to the decoder 210.

In addition, while the decoder 210 analyzes the compressed data read from the compressed data memory to transmit the head over the picture layer to the CPU, the CPU generates the control signal which is necessary for decoding based on the information from the decoder 210. The control signal is provided to the decoder 210. The decoder 210 decodes the remained compressed data which are remained from the compressed data transmitted to the CPU. In decoding process, the data of a motion compensation is required. Accordingly, the decoder 210 outputs the decoded data read request signal to the data memory controller 230.

The decoded data memory controller 230 receives the decoded data read request signal from the decoder 210; transmits the memory control signal, the memory address and the memory data to the data memory interface 250; and reads the decoded data from the decoded memory data to send the read decoded data to the decoder 210.

The decoder 210 decodes the MPEG signal using the compressed data and the decoded data, and then outputs the decoded data and the decoded data request signal to the decoded data memory controller 230. On the other hand, when the decoded data write request signal from the decoder 210 is inputted to the decoded memory controller 230, the decoded memory controller 230 transmits the memory control signal, the memory address, and the memory data to the decoded data memory interface 250 to store the decoded data at the decoded data memory.

The decoded data is utilized in a compensated image of the next image, and then it is read at the display interface 270. The read decoded data is stored at the decoded data memory until it is displayed on the display.

The decoder 210 outputs a display data read request signal to the decoded data memory controller 230 so as to receive the display data. The display data are transformed according to the video apparatus and the data format. The transformed data are provided to the display interface 270. The display interface 270 outputs the data to the display unit.

On the other hand, when the compressed data memory is implemented by a DRAM, the CPU notifies a refresh period during the process of the system setup. The function of the compressed data memory refresh processes a DRAM refresh cycle. However, in case of a SRAM, this function is not processed.

When the refresh request is required, the compressed data memory controller 220 processes three requests in the order of the refresh request, the compressed data write request and the compressed data read request.

In the same manner, when the decoded data memory is implemented by a DRAM, the CPU notifies a refresh period during the process of the system setup. The function of the decoded data memory refresh processes a DRAM refresh cycle. However, in case of a SRAM, this function is not processed. When the refresh request is required, the compressed data memory controller 220 process three requests in the order of the refresh request, the compressed data write request and the compressed data read request.

The compressed data memory controller 220 and the compressed data memory are implemented by a VLSI chip memory of the MPEG decoder. The decoded data memory controller 230 and the decoded data memory are also implemented by a VLSI chip memory of the MPEG decoder.

Figure 4:
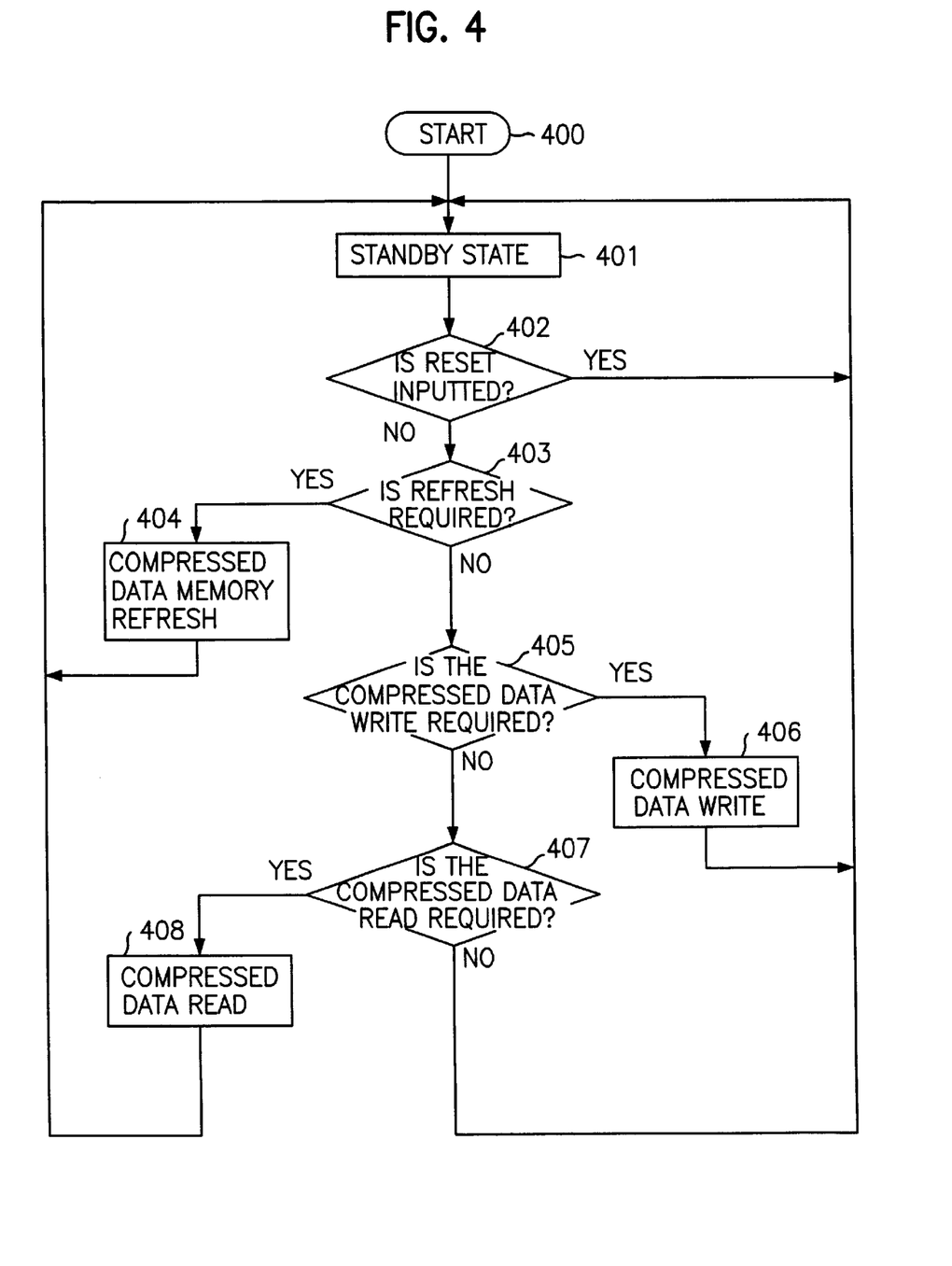
FIG. 4 illustrates a flowchart of a compressed data memory control process of FIG. 3.

FIG. 4 is a flowchart of the compressed data memory control method of FIG. 3.

As shown in FIG. 4, the method of controlling a compressed data of a decoder is as follows.

First, when an outer signal is inputted in a standby state (401), it is determined whether a reset signal is inputted or not (402). If the reset signal is inputted, the standby state (401) is returned, otherwise, if the reset signal is not inputted, it is determined whether a refresh is required or not (403).

According to the above result, in case that refresh is necessary, it is returned to the standby state (401) after operating of the refresh of the compressed data memory (404). And, in case that the refresh is not required, it is determined whether the compressed data write is necessary or not (405). In case that the compressed data write operation is required, the standby state is returned after performing the compressed data write operation. And in case that the compressed data write operation is not required, it is determined whether the compressed data read operation is required or not (407).

Also, in case that the compressed data read operation is required, the standby state (401) is returned after performing compressed data read (408). In case that the compressed data read operation is not required, it is returned to the standby state (401).

Figure 5:
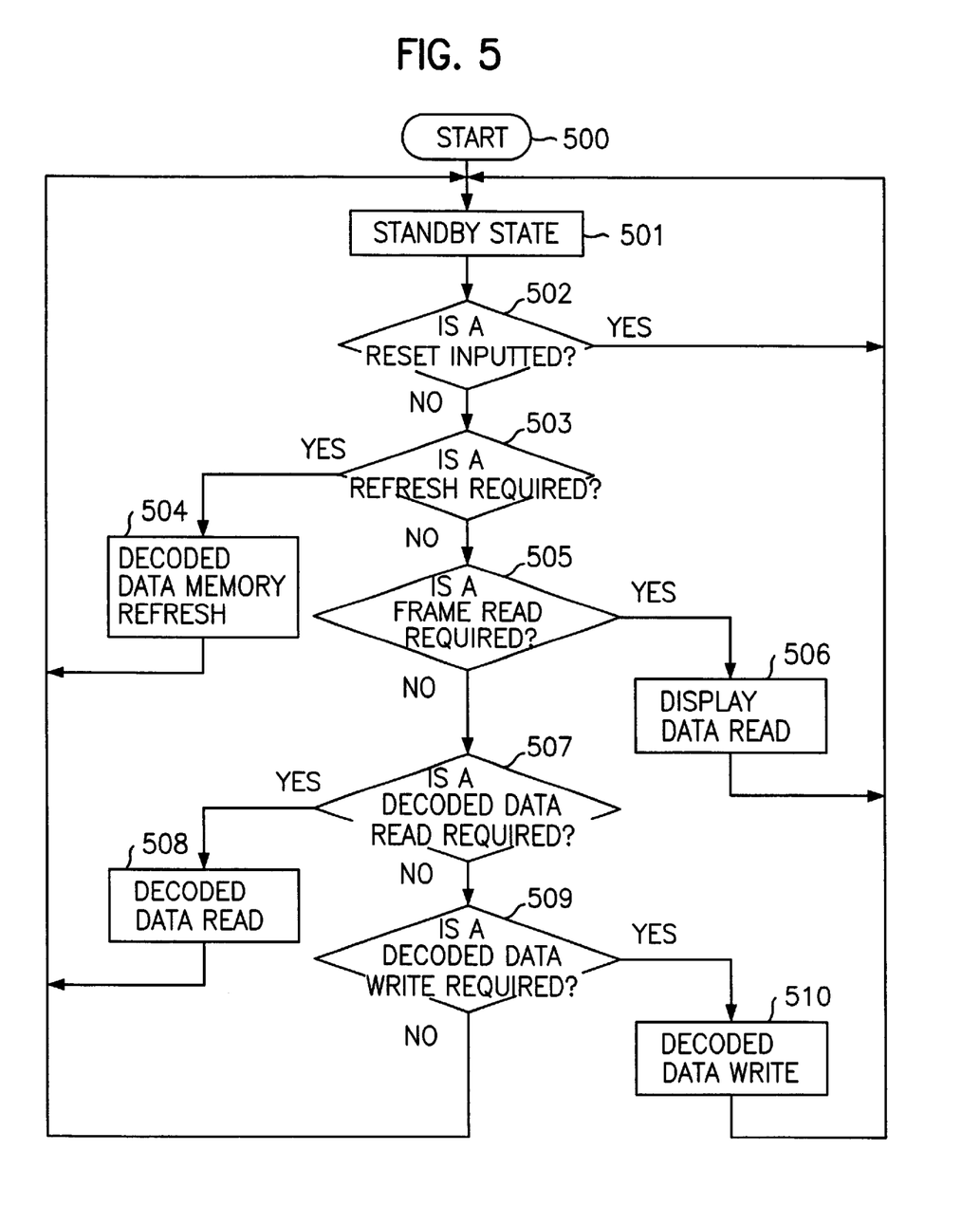
FIG. 5 is a flowchart of a decoded data memory control process of FIG. 3.

FIG. 5 is a flowchart of the decoded data memory control method of FIG. 3. As shown in FIG. 5, a method of controlling a decoded data memory of a decoder is as follows.

First, when an outer signal is inputted in a standby state (501), it is determined whether a reset signal is inputted or not (502). If the reset signal is inputted, the standby state is returned, and if the reset signal is not inputted, it is determined whether a refresh is required or not (503).

According to the above result, in case that refresh is necessary, the standby state (501) is returned after operating of the refresh of the decoded data memory (504). If the refresh is not required, it is determined whether a frame read is required or not (505). In case that the frame read is required, the standby state (501) is returned after performing a display data read (506), and in case that the frame read is not required, it is determined whether the decoded data read operation is required or not (507).

In case that the decoded data read operation is required, the standby state (501) is returned after performing decoded data read operation (508), and in case that the decoded data read operation is not required, it is determined whether the decoded data write operation is required or not (509). In case that the decode data write operation is required, the standby state (501) is returned after performing decoded data write operation (510), and in case that the decoded data write operation is not required, the standby state (501) is returned.

Figure 6:
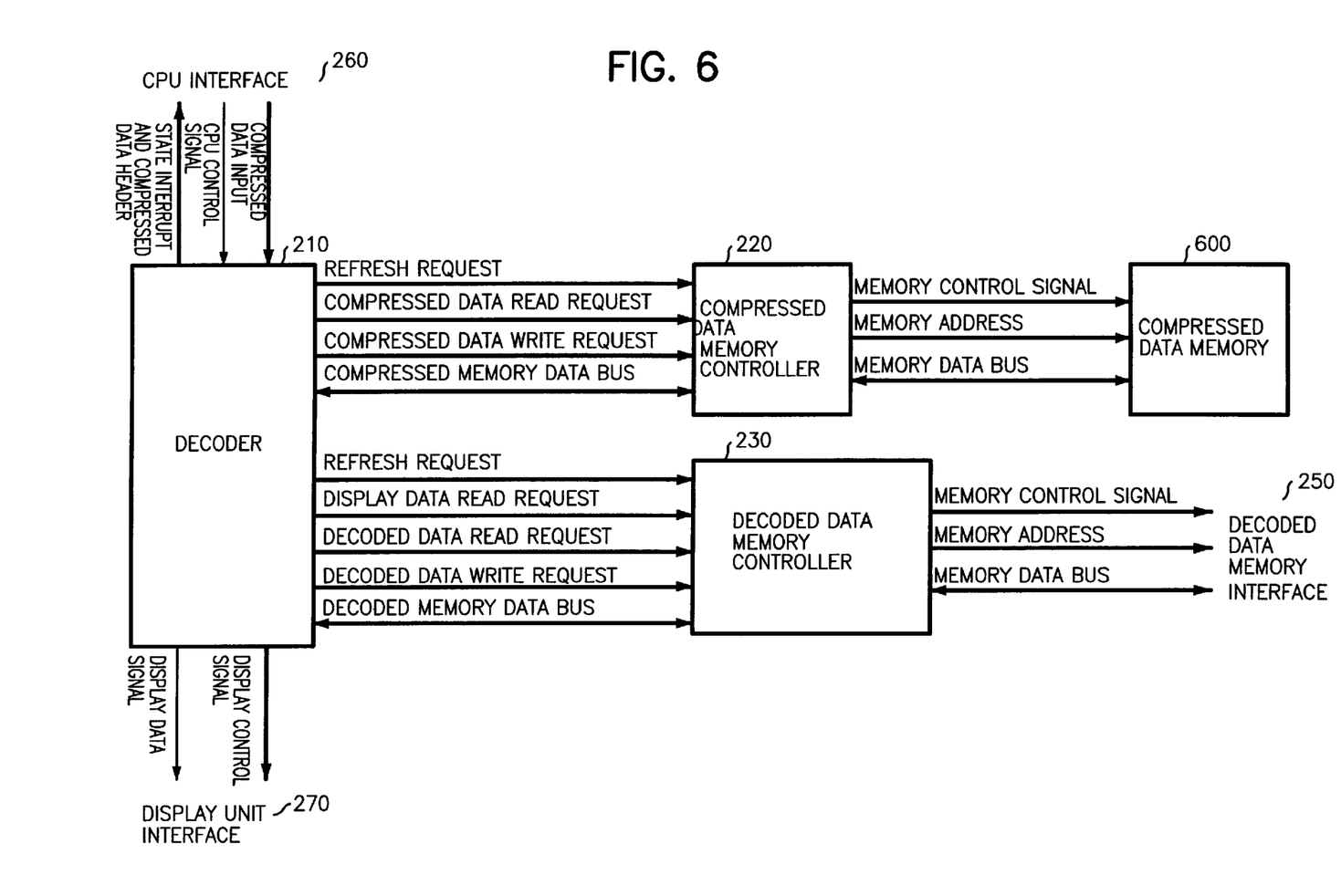
FIG. 6 shows a block diagram of another MPEG decoder with two memory controllers in accordance with the present invention.

FIG. 6 is a block diagram of another MPEG decoder having two memory controllers in accordance with the present invention.

The size of the compressed data in an MPEG application system is smaller than that of the decoded data. Accordingly, two flows of the compressed data and the decoded data are separable, and the storage space of the compressed data is implemented within the MPEG decoder chip. This enables both the number of the pin of the MPEG decoder chip of the present invention and the number of the MPEG decoder of the prior art to be same. Therefore, the compatibility is provided, and the speed of the input and the speed of output of the compressed data are increased to improve the performance of the MPEG decoder system.

As shown in FIG. 6, the MPEG decoder having two memory controllers has a compressed data memory 600 within the chip. The compressed data memory 600 receives the compressed data, the compressed data write control signal, and the memory address from the memory controller 220 to store the compressed data. And also, the compressed data memory 600 receives the compressed data read control signal and the memory address from the compressed data memory controller to output the stored compressed data to the compressed data memory controller 220.

The process of the MPEG decoding in accordance with present invention is as follows.

A. The compressed data are received from the CPU and stored in the compressed data memory.

B. The compressed data are read from the compressed data memory.

C. In order to decode the read compressed data, the previously decoded data are read from the decoded data memory and then the compressed data are decoded by utilizing it.

D. The decoded data are stored at the decoded memory data in order to be used in a next picture motion compensation and the display data.

E. According to a display time of the video apparatus, the decoded data are read from the decoded data memory.

F. Refresh function: the compressed data memory and the decoded data memory are implemented by a DRAM, the DRAM refresh cycle is performed.

The operations of the process A and B are performed by the compressed data memory controller, and the operations of the process C, D and E are performed by the decoded data memory controller.

As described above, in the MPEG decoder of the present invention, since the compressed data flow and the decoded data flow are divided, the memory transfer rate is increased, and also the memory control is simple. In addition, the compressed data are able to store within the MPEG decoder. Accordingly, since the data decoding is simple as described above, the high-performance of the MPEG decoder and the high quality of the image are possible.

Various modification and alterations of this invention will become apparent to those skilled in the art without departing from the scope and spirit of this invention. It should therefore be understood that this invention is not unduly limited to the illustrative embodiments set forth above, but it to be controlled by the limitations set forth in the claims and equivalents thereof.

What is claimed is:

1. An MPEG decoder apparatus for decoding a compressed input data formatted in an MPEG type, comprising:

a decoding unit for performing a decoding function according to a control signal received from a CPU;

a display interface coupled to said decoding unit;

a compressed data memory controller, coupled to said decoding unit and to a compressed data memory, for controlling a compressed data, the compressed data memory controller providing a memory control signal and a memory address to the compressed data memory and being connected to said decoding unit and a compressed memory data bus in order to have decoded data used in a compensation of a next image and be transmitted to a video unit; and, a decoded data memory controller, coupled to said decoding unit and to a decoded data memory, for controlling decoded data;

wherein said decoding unit decodes an MPEG signal using the compressed data and the decoded data, and then outputs the decoded MPEG data and a decoded data request signal to the decoded data memory controller and further, the display interface sends a display data read request signal to the decoded data memory controller to make a display data, transforms the display data to a video data format transmitted from the CPU, and then outputs the transformed data according to a timing signal from the CPU.

2. The MPEG decoder apparatus as claimed in claim 1, wherein the decoding unit stores a data decoding information signal and, in case that compressed data is inputted from said CPU, sends a data write request to said compressed data memory controller in order to store the compressed data in the compressed data memory.

3. The MPEG decoder apparatus as claimed in claim 1, wherein said decoding unit sends a compressed data read request signal to the compressed data memory controller to read the compressed data, and transmits a decoded data read request signal and a decoded data write request signal to the decoded data memory controller to store the decoded data.

4. A method of controlling a data flow divided between a compressed data memory controller and a separate decoded data memory controller of a decoder for decoding a compressed input data formatted in an MPEG type, comprising the steps of:

determining by at least one of said compressed data memory controller and said decoded data memory controller, whether a reset signal is inputted or not when an outer signal is inputted in a standby state, to return to the standby state if the reset signal is inputted or to determine whether a refresh is required or not if the reset signal is not inputted;

returning to the standby state after operating of the compressed data memory controller in case that refresh of the compressed data memory is necessary, and determining whether the compressed data write is necessary or not in case that the refresh of said compressed data memory is not required and, substantially concurrently, returning to the standby state after operating of the decoded data memory controller in case that refresh of the decoded data memory is necessary, and determining whether a frame read is required or not in case that the refresh of said decoded data memory is not required;

returning to the standby state after performing the compressed data write operation by said compressed data memory controller, in case that the compressed data write operation is required, and determining whether the compressed data read operation is required or not, in case that said compressed data write operation is not required and, substantially concurrently, returning to the standby state after performing a display data read by said decoded data memory controller, in case that the frame read is required, and determining whether the decoded data read operation is required, and determining whether the decoded data write operation is required or not in case that the decoded data read operation is not required;

returning to the standby state after performing compressed data read by said compressed data memory controller in case that the compressed data read operation is required, and returning to the standby state in case that the compressed data read operation is not required and, substantially concurrently, returning to the standby state after performing decoded data write by said decoded data memory controller in case that the decoded data write operation is required, and returning to the standby state in case that the decoded data write operation is not required;

whereby using the divided data flow a memory transfer rate is increased and memory control is simplified.

* * * * *